(12) United States Patent
Driesen et al.

(10) Patent No.: US 8,631,406 B2
(45) Date of Patent: Jan. 14, 2014

(54) DISTRIBUTED CLOUD COMPUTING ARCHITECTURE

(75) Inventors: Volker Driesen, Walldorf (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 337 days.

(21) Appl. No.: 12/827,713

(22) Filed: Jun. 30, 2010

(65) Prior Publication Data

US 2012/0005670 A1    Jan. 5, 2012

(51) Int. Cl.
*G06F 9/455* (2006.01)

(52) U.S. Cl.
USPC .............................................. 718/1; 718/104

(58) Field of Classification Search
USPC ............................................................ 718/1
See application file for complete search history.

(56) References Cited

U.S. PATENT DOCUMENTS

| | | | |
|---|---|---|---|
| 6,625,751 B1 * | 9/2003 | Starovic et al. | 714/11 |
| 7,536,541 B2 * | 5/2009 | Isaacson | 713/2 |
| 7,702,843 B1 * | 4/2010 | Chen et al. | 711/6 |
| 7,797,682 B2 * | 9/2010 | Stocker | 717/126 |
| 7,979,857 B2 * | 7/2011 | Esfahany et al. | 718/1 |
| 8,042,108 B2 * | 10/2011 | Suwarna | |
| 8,046,540 B2 * | 10/2011 | Smits et al. | 711/147 |
| 8,103,906 B1 * | 1/2012 | Alibakhsh et al. | 714/13 |
| 8,255,529 B2 * | 8/2012 | Ferris et al. | 709/224 |
| 8,364,802 B1 * | 1/2013 | Keagy et al. | 709/223 |
| 8,402,139 B2 * | 3/2013 | Ferris et al. | 709/226 |
| 2004/0243650 A1 * | 12/2004 | McCrory et al. | 707/203 |
| 2005/0278445 A1 * | 12/2005 | Quang et al. | 709/226 |
| 2006/0167887 A1 * | 7/2006 | Galchev | 707/10 |
| 2006/0195508 A1 * | 8/2006 | Bernardin et al. | 709/203 |
| 2008/0134176 A1 * | 6/2008 | Fitzgerald et al. | 718/1 |
| 2008/0189468 A1 * | 8/2008 | Schmidt et al. | 711/6 |
| 2009/0055674 A1 * | 2/2009 | Mueller et al. | 713/375 |
| 2009/0113109 A1 * | 4/2009 | Nelson et al. | 711/6 |
| 2009/0119673 A1 * | 5/2009 | Bubba | 718/104 |
| 2009/0172799 A1 * | 7/2009 | Morgan | 726/11 |
| 2009/0210873 A1 * | 8/2009 | Cuomo et al. | 718/1 |
| 2009/0249284 A1 * | 10/2009 | Antosz et al. | 717/104 |
| 2009/0300210 A1 * | 12/2009 | Ferris | 709/235 |
| 2010/0115509 A1 * | 5/2010 | Kern et al. | 718/1 |
| 2010/0223385 A1 * | 9/2010 | Gulley et al. | 709/226 |
| 2010/0262964 A1 * | 10/2010 | Uyeda et al. | 718/1 |
| 2010/0287280 A1 * | 11/2010 | Sivan | 709/226 |
| 2010/0293256 A1 * | 11/2010 | Machida | 709/220 |
| 2010/0293409 A1 * | 11/2010 | Machida | 714/4 |

(Continued)

OTHER PUBLICATIONS

D. Yuan, Y. Yang, X. Liu, and J. Chen. (2010) A data placement strategy in scientific cloud workflows. Future Generation Computing Systems, 26:12001214.*

(Continued)

*Primary Examiner* — Emerson Puente
*Assistant Examiner* — Mehran Kamran
(74) *Attorney, Agent, or Firm* — Mintz, Levin, Cohn, Ferris, Glovsky and Popeo, P.C.

(57) ABSTRACT

Availability of processing resources of client computing systems can be registered by a client virtual machine on each of the plurality of client computing systems with a cloud controller. Thereafter, the cloud controller selectively dispatches tasks to at least one of the client virtual machines based on availability of corresponding processing resources and a level of workload in at least one datacenter coupled to the cloud controller. Related apparatus, systems, techniques and articles are also described.

16 Claims, 2 Drawing Sheets

(56) References Cited

U.S. PATENT DOCUMENTS

| | | | |
|---|---|---|---|
| 2010/0318991 A1* | 12/2010 | Venkitachalam et al. | 718/1 |
| 2011/0016214 A1* | 1/2011 | Jackson | 709/226 |
| 2011/0022695 A1* | 1/2011 | Dalal et al. | 709/222 |
| 2011/0022861 A1* | 1/2011 | Agneeswaran et al. | 713/310 |
| 2011/0072138 A1* | 3/2011 | Canturk et al. | 709/226 |
| 2011/0075571 A1* | 3/2011 | Hao et al. | 370/245 |
| 2011/0093849 A1* | 4/2011 | Chawla et al. | 718/1 |
| 2011/0131316 A1* | 6/2011 | Ferris et al. | 709/224 |
| 2011/0131589 A1* | 6/2011 | Beaty et al. | 719/318 |
| 2011/0209064 A1* | 8/2011 | Jorgensen et al. | 715/733 |
| 2011/0252271 A1* | 10/2011 | Frenkel et al. | 714/4.1 |
| 2011/0258621 A1* | 10/2011 | Kern | 718/1 |
| 2011/0276673 A1* | 11/2011 | Piazza et al. | 709/223 |
| 2011/0289555 A1* | 11/2011 | DeKoenigsberg et al. | 726/3 |
| 2011/0314465 A1* | 12/2011 | Smith et al. | 718/1 |
| 2011/0320606 A1* | 12/2011 | Madduri et al. | 709/226 |
| 2012/0089980 A1* | 4/2012 | Sharp et al. | 718/1 |
| 2012/0117565 A1* | 5/2012 | Staelin et al. | 718/1 |
| 2012/0166663 A1* | 6/2012 | Moon | 709/229 |
| 2012/0278287 A1* | 11/2012 | Wilk | 707/654 |

OTHER PUBLICATIONS

Pallickara (Granules: A Lightweight, Streaming Runtime for Cloud Computing With Support for Map-Reduce. Proceedings of the IEEE International Conference on Cluster Computing (CLUSTER 2009). New Orleans, LA.).*

D. Yuan, Y. Yang, X. Liu, and J. Chen titled "A data placement strategy in scientific cloud workflows" Future Generation Computer Systems 26 (2010) p. 12001214 (Available online Feb. 18, 2010).*

* cited by examiner

DISTRIBUTED CLOUD COMPUTING ARCHITECTURE

TECHNICAL FIELD

The subject matter described herein relates to a cloud computing architecture which utilizes a datacenter as well as a series of desktop personal computers (PCs).

BACKGROUND

Datacenters are increasingly adopting commodity hardware as opposed to a few scale-up high-end machines. Modern software architecture is increasingly being built on a scale-out model leveraging many reasonably powered but inexpensive server blades. At the same time, end-user personal computers are becoming more powerful and are quickly approaching the performance capabilities of server blades in the datacenter. One byproduct of such trends is that available resources in datacenters are often consumed by running various business applications (which can sometimes be insufficient during peak-load conditions) while end-user PCs (e.g., client systems) are often overpowered in relation to the tasks being executed thereon.

SUMMARY

In one aspect, availability of processing resources of client computing systems are registered by a client virtual machine on each of the plurality of client computing systems with a cloud controller. Thereafter, the cloud controller selectively dispatches tasks to at least one of the client virtual machines based on availability of corresponding processing resources and a level of workload in at least one datacenter coupled to the cloud controller.

The client virtual machines can de-register the availability of processing resources for the corresponding client computing systems with the cloud controller upon a triggering event. The triggering event can include shutting down the corresponding client computing system. The triggering event can also be based on a level of processing resources required by one or more local applications on the client computing system requiring exceeding a pre-defined threshold. Such information can be obtained, for example, by the client virtual machine communicating with an operating system of the client computing system to determine if the level of processing resources required exceeds the pre-defined threshold. As part of de-registering, the services being executed in the client virtual machine can be terminated in an orderly fashion (which is not always possible when the client computing system is abruptly shut down).

The client computing systems can update the availability of their respective processing resources with the cloud controller based on changing requirements for one or more local applications being executed on the corresponding client computing system.

The client virtual machine can be hidden from users of the client computing systems such that the users do not see which services are being executed by the client virtual machines and the users cannot access data being processed by the client virtual machines.

In some cases, tasks can be dispatched in a redundant manner. For example, the cloud controller can dispatch a first task to at least two of the client virtual machines and uses results from the first client virtual machine to provide the results. The cloud controller can then terminate the first task on each client virtual machine still executing the first task upon first the client virtual machine providing the results.

The dispatched tasks can, in some cases, be limited to stateless tasks that do not require disk storage on the client computing system and/or central persistency during execution. In addition or in the alternative, the dispatched tasks can be limited to tasks that can be executed within a pre-defined amount of time.

In another aspect, a system is provided that includes a plurality of client computing systems, each client computing system executing at least one local application and a client virtual machine, a plurality of server computing systems within at least one datacenters, each server computing system executing at least one server virtual machine, and a cloud controller computing system executing a cloud controller. With such an arrangement, the client virtual machines register and de-register availability of processing resources for the corresponding client computing systems with the cloud controller. In addition, the cloud controller selectively dispatches tasks to at least one of the client virtual machines based on availability of corresponding processing resources and a level of workload in the at least one datacenter.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

The subject matter described herein provides many advantages. For example, the current subject matter allows companies to extend cloud datacenters to the desktop and leverage excess performance on idle PCs within their organizations to satisfy performance needs not covered in the datacenter (and without the need for "renting" additional capacity in the cloud).

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
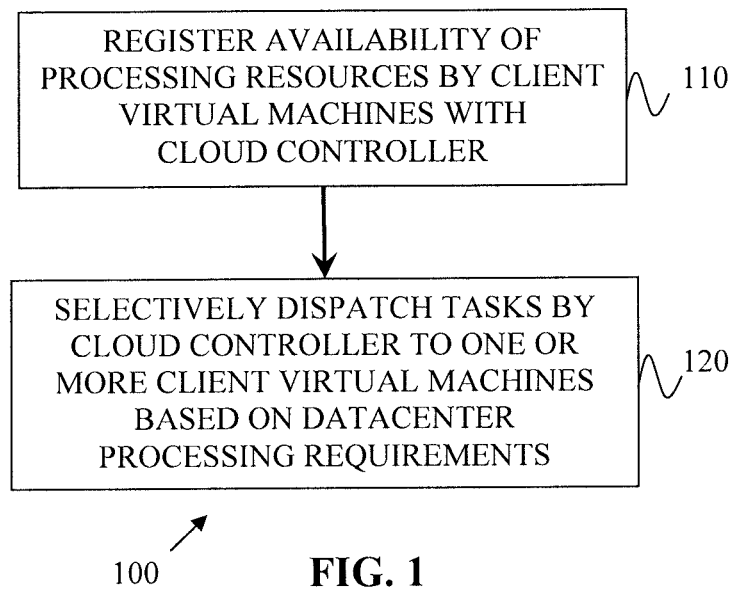
FIG. 1 is a process flow diagram illustrating the selective dispatch of tasks to registered client virtual machines by a cloud controller.

FIG. 1 is a processing flow diagram illustrating a method 100 in which, at 110, availability of processing resources of client computing systems are registered by a client virtual machine on each of the plurality of client computing systems with a cloud controller. Thereafter, at 120, the cloud controller selectively dispatches tasks to at least one of the client virtual machines based on availability of corresponding processing resources and a level of workload in at least one datacenter coupled to the cloud controller.

Figure 2:
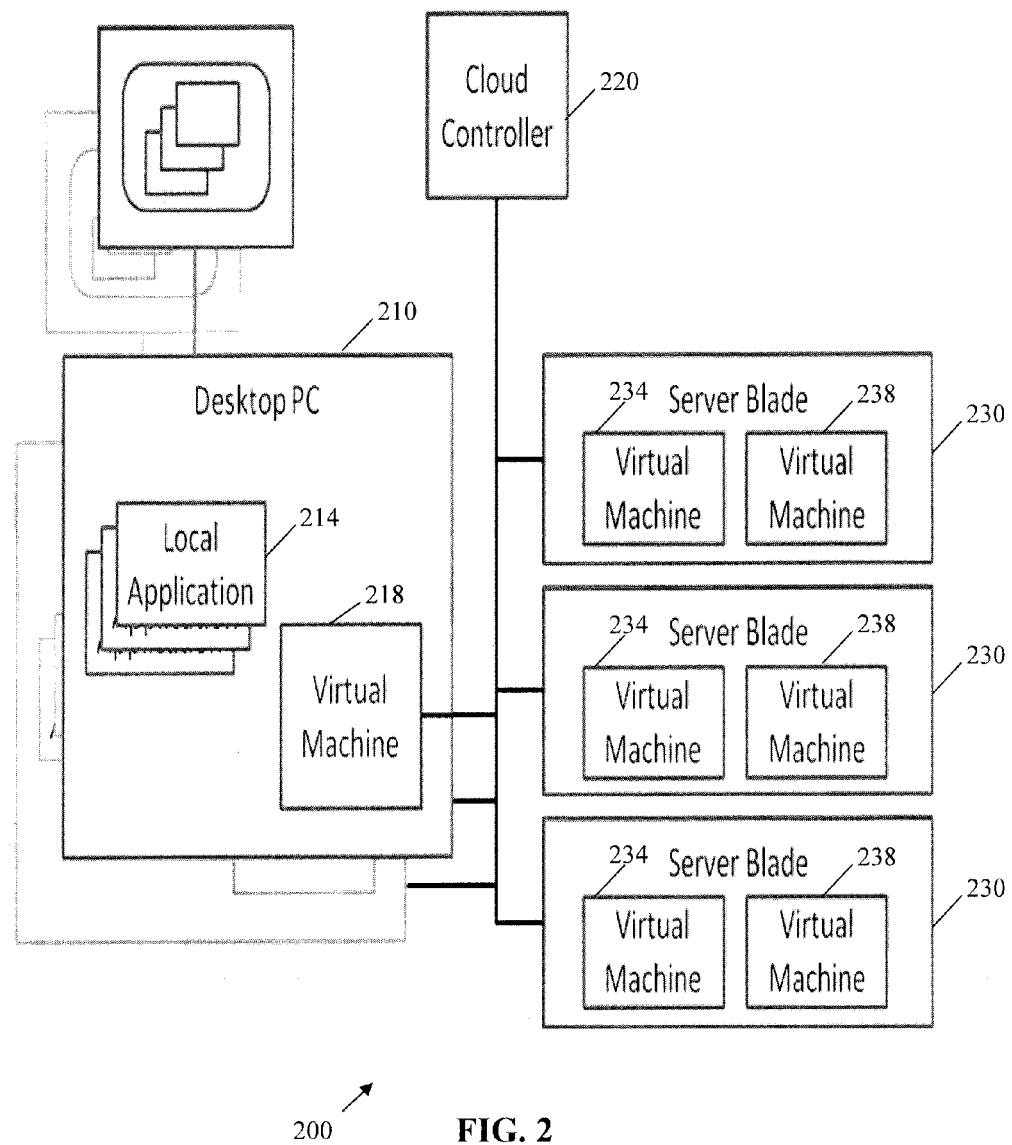
FIG. 2 is a system diagram illustrating a cloud controller coupled to a plurality of desktop PCs as well as server computing systems within a datacenter.

FIG. 2 is a system diagram 200 including a plurality of desktop PCs 210 (also referred to as client computing systems) each executing one or more local applications 214 and a client virtual machine 218. Also included are a plurality of servers 230 which each execute one or more server virtual machines 234, 238. The plurality of servers 230 can be considered to form part of one or more datacenters. Central cloud control is managed by a cloud controller 220 which is in communication with the client virtual machines 218 and one or more server virtual machines 234, 238 on each server 230. The cloud controller 220 determines to which virtual machine 218, 234, 238 each task will be dispatched for execution.

The client virtual machine 218 can be started as a background service when the desktop operating system on the desktop PC 210 is booted. A cloud client running inside of this client virtual machine 218 can register the client virtual machine 218 at the central cloud controller 220 and publish the available capacity of the client virtual machine 218. The cloud client can also de-register the available capacity of the client virtual machine 218 when a triggering event occurs. The triggering events can include the desktop PC 210 being shut down by the user, available processing resources of the client virtual machine 218 and/or desktop PC 210 falling below a pre-defined level, and the like. Such a triggering event can result in a clean shut down of the services running inside the client virtual machine 218. The client virtual machine 218 requires access to the host operating system of the desktop PC 210 to adjust itself corresponding to the dynamic load situation caused by the end user: When the desktop local applications 214 require more performance (i.e., processing resources, etc.), the client virtual machine 218 scales down. When the desktop local applications 214 are idle, the client virtual machine 218 can scale up. Such changes in the operating environment are continuously communicated by the cloud client from the client virtual machine 218 to the central cloud controller 220.

The client virtual machine 218 can be hidden from the user in that way, that the user cannot "look into" this client virtual machine 218 and therefore neither see what services are executed there nor get access to the data processed (such restrictions can be implemented, for example, using specialized processor architectures). In some implementations, the user cannot stop the client virtual machine 218 (unless by shutting down the complete system/desktop PC 210). This arrangement can help ensure that whatever service is dispatched to a desktop PC 210, data confidentiality requirements are always fulfilled. In addition, communications between the client virtual machine 218 and the central cloud controller 220 can be encrypted and/or compressed.

The central cloud controller 220 can handle two additional situations that are special to an environment such as that illustrated in FIG. 2. First, the central cloud controller 220 can react to changes in the performance capacity of the client virtual machines 218 running on the desktop PCs 210 by starting up or shutting down additional services on further desktop PCs 210 to compensate for such fluctuations. Second, the central cloud controller 220 can take into account unexpected shut downs by desktop PCs 210. As stated above, the cloud client will try to cleanly shut down the services running inside the corresponding client virtual machine 218 and de-register the client virtual machine 218. Such an occurrence is in contrast to the interactions of the cloud controller 220 with the server virtual machines 234, 238 in a datacenter which are typically brought online/offline in a centralized manner (and which are not the subject of user centric actions such as a user turning off a desktop PC 210).

In some variations, to compensate the risk that a desktop PC 210 is shut down without prior notice or taken from the network, the cloud controller 220 can dispatch tasks with redundancy. For example, a task can be dispatched to not only one client virtual machine 218, but to client virtual machines 218 on two or more different desktop PCs 210. Various mechanisms can be used for determining which results to use such as simply taking the first result provided regardless of the source. In such arrangements, the cloud controller 220 can also terminate redundant dispatched tasks once the first result is received.

The cloud controller 220 can utilize selection criteria for dispatching of tasks to be processed in the desktop PC 210 cloud to further reduce the requirements of continuous performance and high availability of the desktop PCs 210. Sample selection criteria include: 1) Dispatch "stateless" tasks to the desktop cloud, not tasks requiring local disk storage or tasks updating a central persistency during the task execution; and 2) Dispatch short tasks, no long running "batch jobs". As an example, the rendering of print forms, which is a high volume performance consuming process, fulfills both criteria and is well suited to run on a desktop cloud.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method comprising:
    registering, by a client virtual machine on each of a plurality of client computing systems, availability of processing resources for the corresponding client computing systems with a cloud controller;
    selectively dispatching, by the cloud controller, tasks from at least one server computing system coupled to the cloud controller to at least one of the client virtual machines based on availability of corresponding processing resources and a level of workload in the corresponding at least one server computing system, the cloud controller redundantly dispatching a plurality of tasks to different client virtual machines executing on different client computing systems and terminates such redundantly dispatched tasks when a first result is received indicating that a corresponding task has been completed; and
    de-registering, by the client virtual machine on each of the plurality of client computing systems, the availability of processing resources for the corresponding client computing systems with the cloud controller upon a triggering event based on a level of processing resources required by one or more local applications on the client computing system requiring exceeding a pre-defined threshold;
    wherein:
        each virtual client machine accesses the host operating system of the corresponding client computing system to adjust to dynamic load changes caused by an end user operating the corresponding client computing system, and
        dispatched tasks are limited to tasks that can be executed within a pre-defined amount of time.

2. A method as in claim 1, wherein the triggering event is shutting down the corresponding client computing system.

3. A method as in claim 1, wherein the client virtual machine communicates with an operating system of the client computing system to determine if the level of processing resources required exceeds the pre-defined threshold.

4. A method as in claim 1, further comprising:
    terminating services being executed in the client virtual machine when such client virtual machine is de-registered.

5. A method as in claim 1, wherein the client computing systems update the availability of their respective processing resources with the cloud controller based on changing requirements for one or more local applications being executed on the corresponding client computing system.

6. A method as in claim 1, wherein the client virtual machine is hidden from users of the client computing systems such that the users do not see which services are being executed by the client virtual machines and the users cannot access data being processed by the client virtual machines.

7. A method as in claim 1, wherein the cloud controller dispatches a first task to at least two of the client virtual machines and uses results from the first client virtual machine to provide the results.

8. A method as in claim 7, wherein the cloud controller terminates the first task on each client virtual machine still executing the first task upon first the client virtual machine providing the results.

9. A method as in claim 1, wherein the dispatched tasks further comprise stateless tasks that do not require disk storage on the client computing system and/or central persistency during execution.

10. An article of manufacture comprising:
    computer executable instructions stored on non-transitory computer readable media, which, when executed by at least one data processor of at least one computer system, results in operations comprising:
        registering and de-registering, by client virtual machines on each of a plurality of client computing systems, availability of processing resources for the corresponding client computing systems with a cloud controller; and
        selectively dispatching, by the cloud controller, tasks from the client virtual machines to at least one of the other client virtual machines based on availability of corresponding processing resources, the cloud controller redundantly dispatching a plurality of tasks to different client virtual machines executing on different client computing systems and terminates such redundantly dispatched tasks when a first result is received indicating that a corresponding task has been completed;
    wherein:
        the client virtual machine on each of the plurality of client computing systems deregisters the availability of processing resources for the corresponding client computing systems with the cloud controller upon a triggering event that is based on a level of processing resources required by one or more local applications on the client computing system requiring exceeding a pre-defined threshold,
        each virtual client machine accesses the host operating system of the corresponding client computing system to adjust to dynamic load changes caused by an end user operating the corresponding client computing system,
        dispatched tasks are limited to tasks that can be executed within a pre-defined amount of time, and
        each virtual client machine accesses the host operating system of the corresponding client computing system to adjust to dynamic load changes caused by an end user operating the corresponding client computing system.

11. An article as in claim 10, wherein the triggering event is shutting down the corresponding client computing system and/or is based on a level of processing resources required by one or more local applications on the client computing system requiring exceeding a pre-defined threshold.

12. An article as in claim 10, wherein the client computing systems update the availability of their respective processing resources with the cloud controller based on changing requirements for one or more local applications being executed on the corresponding client computing system.

13. An article as in claim 10, wherein the client virtual machine is hidden from users of the client computing systems such that the users do not see which services are being executed by the client virtual machines and the users cannot access data being processed by the client virtual machines.

14. An article as in claim 10, wherein the cloud controller dispatches a first task to at least two of the client virtual machines and uses results from the first client virtual machine to provide the results, and wherein the cloud controller terminates the first task on each client virtual machine still executing the first task upon first the client virtual machine providing the results.

15. An article as in claim 10, wherein the dispatched tasks comprise stateless tasks that do not require disk storage on the client computing system and/or central persistency during execution.

16. A system comprising:
   a plurality of client computing systems, each client computing system executing at least one local application and a client virtual machine;
   a plurality of server computing systems within at least one datacenter, each server computing system executing at least one server virtual machine; and
   a cloud controller computing system executing a cloud controller;
   wherein:
      the client virtual machines register and de-register availability of processing resources for the corresponding client computing systems with the cloud controller;
      the cloud controller selectively dispatches tasks from one or more of the executing server virtual machines to at least one of the other client virtual machines based on availability of corresponding processing resources and a level of workload in the at least one datacenter;
      the cloud controller redundantly dispatches a plurality of tasks to different client virtual machines executing on different client computing systems and terminates such redundantly dispatched tasks when a first result is received indicating that a corresponding task has been completed;
      the client virtual machine on each of the plurality of client computing systems deregisters the availability of processing resources for the corresponding client computing systems with the cloud controller upon a triggering event that is based on a level of processing resources required by one or more local applications on the client computing system requiring exceeding a pre-defined threshold,
      each virtual client machine accesses the host operating system of the corresponding client computing system to adjust to dynamic load changes caused by an end user operating the corresponding client computing system, and
      dispatched tasks are limited to tasks that can be executed within a pre-defined amount of time.

* * * * *